WALTER E. SANDERS
RICHARD HOPPER, JR.
INVENTORS.

BY
BLAIR, SPENCER & BUCKLES
ATTORNEYS.

Sept. 11, 1962 W. E. SANDERS ET AL 3,053,435
LIQUID PRESSURE CONTROLLING APPARATUS
Filed Aug. 4, 1959 3 Sheets-Sheet 3
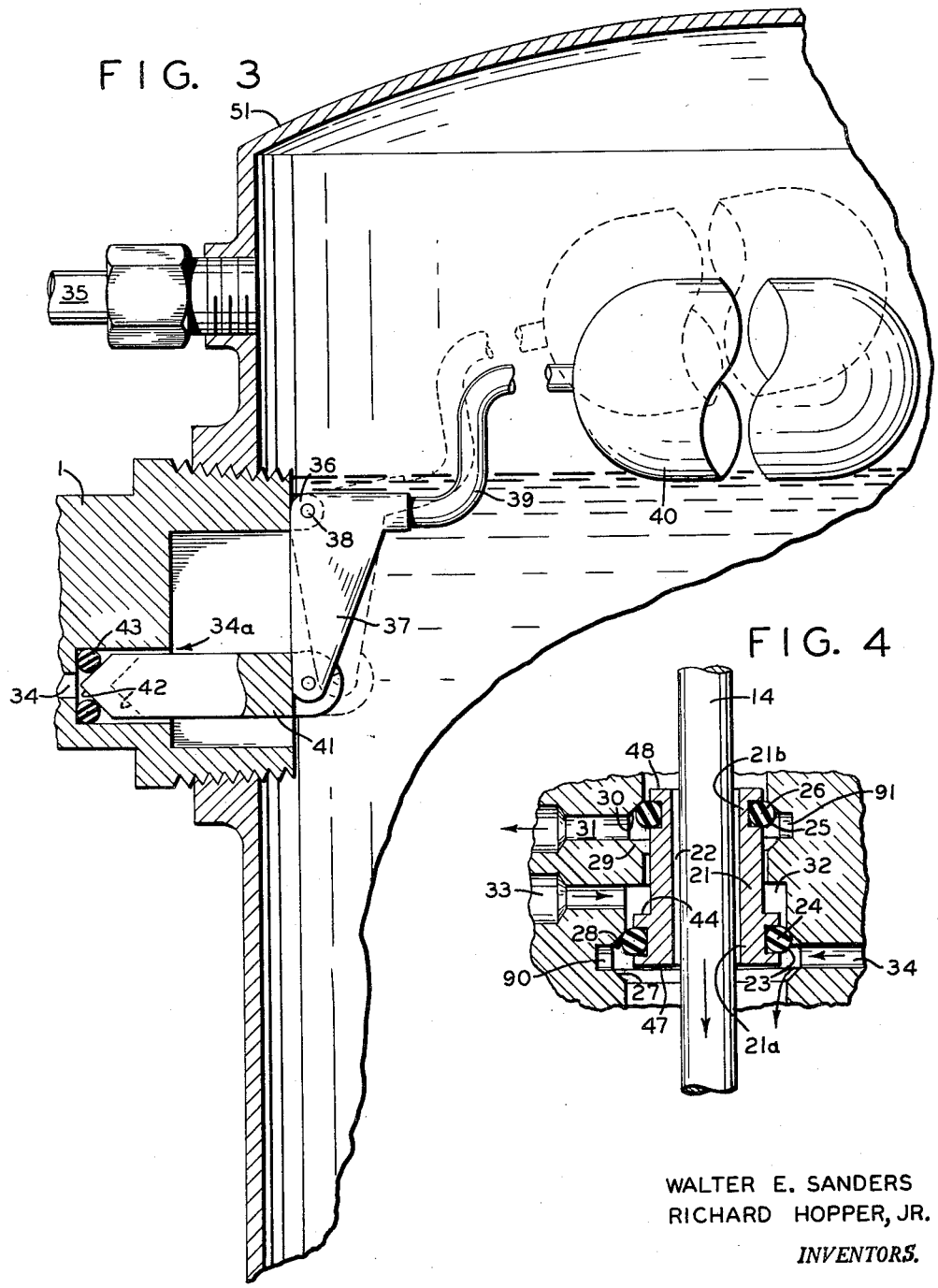
WALTER E. SANDERS
RICHARD HOPPER, JR.
*INVENTORS.*
BY
BLAIR, SPENCER & BUCKLES
ATTORNEYS.

United States Patent Office 3,053,435
Patented Sept. 11, 1962

3,053,435
LIQUID PRESSURE CONTROLLING APPARATUS
Walter E. Sanders, 116 Colloden Road, Stamford, Conn., and Richard Hopper, Jr., Noah's Lane, Norwalk, Conn.
Filed Aug. 4, 1959, Ser. No. 831,568
6 Claims. (Cl. 230—52)

This invention relates to improved water supply systems for homes and buildings, and particularly to such systems incorporating pressure-booster devices to raise the pressure of water drawn from wells, low pressure mains and the like for domestic use.

When a source of water such as a well or a low pressure main supplies water to a building or a rural home, pressure-boosting devices must be used to deliver water throughout the building. In such situations, water systems generally include a booster pump employed to raise the water pressure for delivery to taps and outlets. Such a pump usually works in conjunction with a pressure tank, with the pump supplying water to the tank in which is trapped a fixed pocket of air. As water is delivered to the tank under pressure the air is compressed, and thus furnishes a pressurized water source for the system during periods when the water pump is not in operation.

The pump is normally actuated by a pressure responsive switch, causing the pump to operate when pressure in the pressure tank drops below a predetermined minimum, and stopping operation when pressure reaches a predetermined point.

The dissolving of the trapped compressed air in water stored in the pressure tank and later drawn therefrom creates a serious problem in pump operation. As air dissolves, the volume of air trapped in the tank decreases, and this reduces the effectiveness of the pressure tank. Accordingly the water pump must operate more frequently to provide sufficient pressure for delivery of water to the building, and an intermittent on-off pumping operation results.

Various devices have been proposed for introducing small amounts of air into the pressure tank to replace air dissolved in the water supplied to the system. These devices have many disadvantages. Some of them are designed for use with particular types of pumps, and therefore have no general application. Others incorporate delicate mechanisms similar to pneumatic tire valves, which are subject to clogging with accumulated sediment. These devices have generally afforded poor results because of their faulty and undependable operation.

Accordingly a principal object of the present invention is to provide a dependable and automatic water supply system adapted to deliver water throughout a home or building at pressures varying within a predetermined range, regardless of the pressure of the water source supplying water to the building.

A further object of the present invention is to provide water supply systems of the above character incorporating a pressure tank and a compressor system adapted to maintain a predetermined volume of air within the tank.

Another object of the present invention is to provide compressor systems of the above character capable of effective operation with different types of pressure tanks and pumps.

A further object of the invention is to provide compressor systems of the above character of rugged and sturdy construction, with a minimum number of moving parts.

Another object of the present invention is to provide compressor systems of the above character which are economical to manufacture and convenient to install.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 3 is a vertical sectional view of a float inlet valve which may be employed with the assembly of FIGURE 2; and FIGURE 4 is a fragmentary vertical sectional view of a portion of the assembly shown in FIGURE 2.

Figure 1:
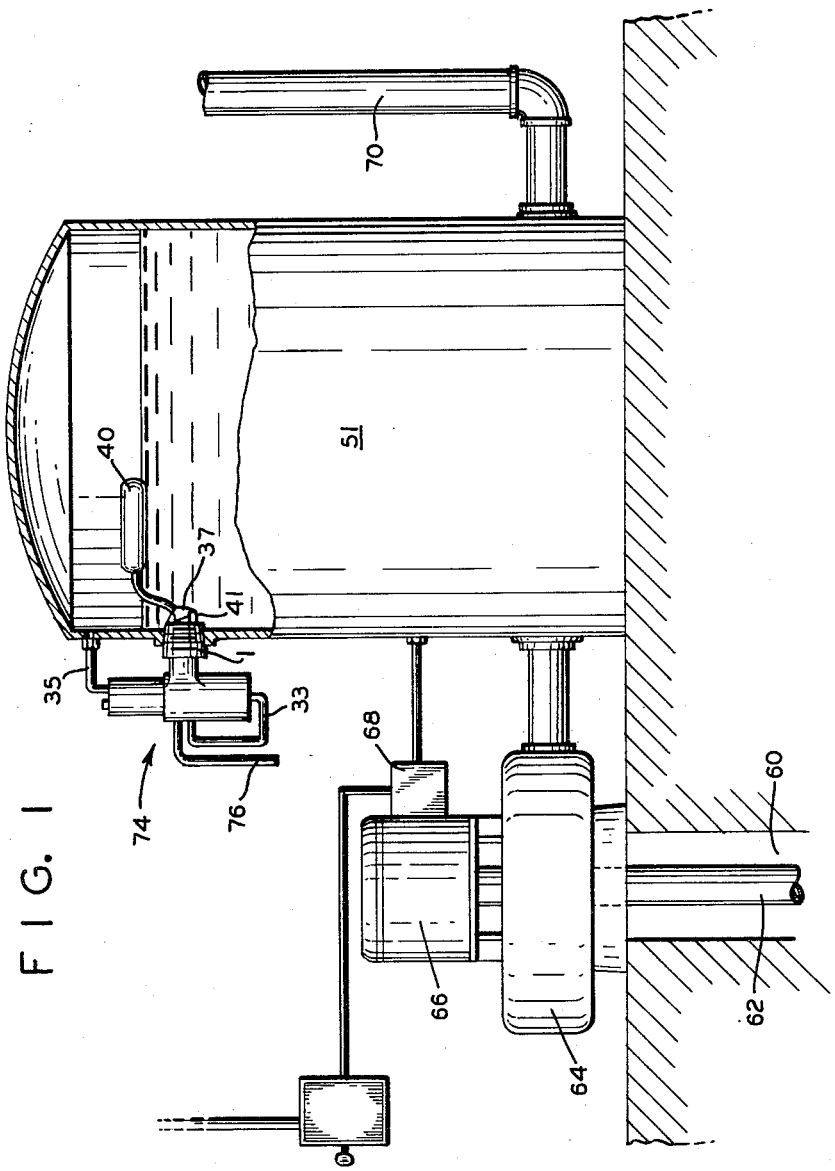
FIGURE 1 is a schematic diagram of a water supply system incorporating a preferred form of the invention.

Referring first to FIGURE 1, water from a low pressure source such as a well 60 is supplied by the system to a home, building or other structure. Conduit 62 delivers water to a booster pump 64 driven by an electric motor 66. Pump 64 supplies water under pressure to a pressure tank 51, a portion of which is shown in enlarged detail in FIGURE 3. A pressure switch 68 responsive to pressure within the tank 51 controls the operation of motor 66 and the pump 64 driven thereby. Pressure tank 51 delivers water to the building by way of a supply conduit 70.

A compressor unit generally indicated at 74 is positioned adjacent pressure tank 51 and has a projecting central valve block 1 mounted in a threaded aperture in tank 51. Valve block 1 contains a water supply passage 34 (FIG. 2) connecting tank 51 and the compressor unit 74. The compressor unit is also provided with an exhaust conduit 76 leading to waste and with an air delivery conduit 35 also joining tank 51. A float positioned within the tank 51 controls a float valve member 41 to admit water under pressure from tank 51 into compressor unit 74, as described more fully below.

In systems of the kind shown in FIGURE 1, the pocket of air trapped in tank 51 above the surface of the water stored therein acts as a compressible cushion applying pressure to supply water through conduit 70 to the distributing system of taps and outlets. As water is drawn from tank 51 via conduit 70, the pump 64 delivers more water to tank 51, compressing this air pocket, until the pressure-responsive switch 68 senses and responds to a predetermined maximum pressure and stops pump motor 66. The system continues to draw water from source 60 and store it in pressure tank 51, but the air trapped in tank 51 is progressively dissolved and carried away by water stored in tank 51 and drawn therefrom to distribution conduit 70. This progressive loss of entrapped air from tank 51 reduces the desirable compressible cushioning effect and pressure-delivery achieved by the air pocket, since the compression energy stored in the reduced volume of air is more quickly exhausted as water is drawn from tank 51. Pressure fluctuations within tank 51 are thus less cushioned and more rapid, resulting in more frequent, on-off pumping operation of pump 64 to maintain the pressure within tank 51 within the preselected pressure range of pressure-responsive switch 68.

Such frequent starting and stopping of motor 66 and pump 64 produces unnecessary wear in these units, and undesirable noise and vibration in the system as a whole. The present invention overcomes these disadvantages by automatically maintaining a substantially constant preselected ratio of air to water within tank 51 through the operation of the automatic regulating system hereinafter described.

By maintaining this air-water ratio at a substantially constant value, the desirable cushioning effect of the entrapped and compressed air pocket is maintained, significantly improving the operation and dependability of the system as a whole, and extending its useful life by minimizing the switching and pumping operations required to deliver water at the desired pressure.

Figure 2:
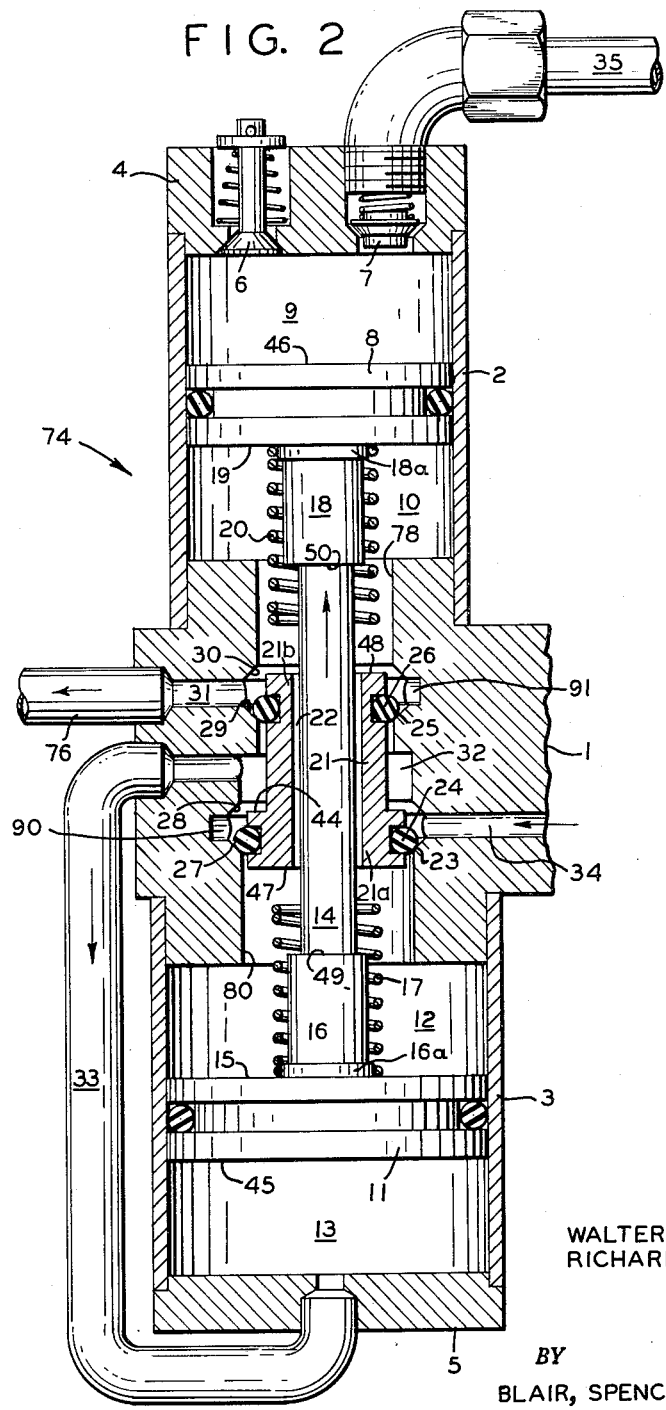
FIGURE 2 is a vertical sectional view of a compressor mechanism employed in one system embodying the present invention.

An enlarged sectional view of the pumping or compressor unit 74 is shown in FIGURE 2, where it will be seen that the compressor unit includes a central valve block 1, containing a step-bored cylindrical passageway 78, 80 extending vertically therethrough. Two cooperating piston-and-cylinder units are incorporated in compressor unit 74. A pump cylinder or compressor cylinder 2 is positioned adjacent the upper end 78 of this passageway and a slightly larger motor cylinder 3 is positioned adjacent its larger lower end 80. A compressor cylinder head 4 closes the compressor cylinder, and a motor cylinder head 5 closes the motor cylinder. An air intake check valve 6 is mounted in compressor cylinder head 4, and valve 6 is spring restrained, opening only when a partial vacuum is produced within cylinder 2 by the downward movement of a compressor piston 8 therein. An air outlet valve 7 is similarly mounted in cylinder head 4, joining compressor cylinder 2 to the air delivery conduit 35 leading to tank 51.

The compressor piston 8 is reciprocably mounted within compressor cylinder 2, forming a compression chamber 9 between piston 8 and head 4, and also forming a pressure chamber 10 between piston 8 and valve block 1. A motor piston 11, slightly larger in diameter than compressor piston 8, is reciprocably mounted in motor cylinder 3, forming a return chamber 12 between piston 11 and valve block 1, and a motor chamber 13 between piston 11 and cylinder head 5. The cylinders 2 and 3 are preferably co-axial, as shown in FIGURE 2 and a piston rod or shaft 14 joins piston 8 and piston 11 to form an integral reciprocating piston assembly.

Adjacent to the inner or return face 15 of the motor piston 11 is a piston stem 16. An enlarged flange 16a is formed at the base of piston stem 16 adjacent piston return face 15 and a helical compression spring 17 is secured to piston 11 at flange 16a, extending upwardly surrounding stem 16 and piston rod 14. A similar piston stem 18 is formed adjacent pressure face 19 of compressor piston 8, with a similar flange 18a on which a second helical compression spring 20 is secured surrounding piston rod 14.

A reciprocable cylindrical valve element 21 is positioned for reciprocating axial motion within the step-bored channel 78, 80 passing through valve block 1. Valve element 21 is provided with an aperture 22 passing axially therethrough and accommodating piston rod 14, while also providing space for the flow of fluid through aperture 22 between valve element 21 and piston rod 14. Valve element 21 is adapted to reciprocate between a lower "compression" position shown in FIGURE 2 and an upper "intake" position shown in FIGURE 4. In the compression position of FIGURE 2, valve face 23, formed by a resilient and substantially toroidal O-ring 24 surrounding the lower portion 21a of valve element 21, is seated against an annular chamfered valve seat 27. An upper valve face 25 formed by a similar but smaller O-ring 26 surrounding the smaller upper portion 21b of valve element 21 is seated against a similar annular chamfered valve seat 29.

In the intake position of valve element 21 as shown in FIGURE 4, the lower O-ring 24 is seated against a second lower annular valve seat 28, and the upper O-ring 26 is seated against a second upper annular valve seat 30. An annular chamber 90 surrounding valve element 21 is formed between the pair of lower valve seats 27 and 28, and a similar but smaller annular chamber 91 is formed between the pair of upper valve seats 29 and 30. The pressure fluid supply passage 34 is connected to the lower annular chamber 90, and an exhaust port 31 is connected to the upper annular chamber between valve seats 29 and 30. Exhaust port 31 is connected to exhaust line 76 leading to the sewer as shown in FIGURE 1. A by-pass conduit 33 best seen in FIGURE 2 connects the step-bored passage 78, 80 in valve block 1 to the motor chamber 13 at the outer end of the motor cylinder 3.

FIGURE 3 is an enlarged detailed view of the mechanism governing the supply of water under pressure from the pressure tank 51 to the compressor mechanism shown in FIGURE 2. The air conduit 35, conducting compressed air from air outlet valve 7 to pressure tank 51, enters the upper portion of the pressure tank as shown in FIGURE 3. Valve block 1 is mounted in the wall of pressure tank 51 and positioned below the air conduit 35. A boss 36 is formed on valve block 1 in pressure tank 51, and an arm 37 is pivotally mounted thereon by a pin 38. A float arm 39 is connected to arm 37 and to a float 40. A float valve member 41 is pivotally connected to the lower portion of arm 37 and has a valve face 42 adapted to seat against an O-ring 43 secured within an enlarged entrance portal 34a of water supply passage 34. Thus when the volume of air in the pressure tank 51 is reduced and the water level rises, as described above, float 40 is carried upward, pivoting arm 37 about pin 38 to withdraw valve element 41 from its seated position against O-ring 43, to allow water from the tank to flow through supply passage 34.

Returning to FIGURE 2, it will be seen that motor piston 11 and compressor piston 8 are of different sizes, and the resulting difference in the areas of pressure face 45 of piston 11 and compression face 46 of piston 8 allows for operation of the described mechanism; this is supplemented by the difference in areas between return face 15 of piston 11 and pressure face 19 of piston 8. In addition, valve element 21 is provided with a peripheral shoulder 44 between its lower portion 21a and its smaller upper portion 21b; the lower end face 47 and upper end face 48 of valve element 21 are likewise of different sizes to provide needed differential forces essential to the operation of the mechanism. Furthermore, shoulder 49 of piston stem 16 coacts with helical coil spring 17 to effect the transfer of valve element 21 from its lower position to its upper position; and shoulder 50 of piston stem 18 coacts with spring 20 in a similar manner to effectuate the return of valve element 21. The actuation and advantages of this valve element 21 are described hereinafter in detail.

The operation of the system will be easily understood by reference to FIGURES 2 and 3. When the volume of air trapped and compressed in pressure tank 51 is reduced below a certain predetermined amount by being absorbed in water delivered to the system as described above, float 40 rises with the rising level of water in tank 51, opening float valve element 41 and allowing this water under pressure to flow into pressure conduit 34. When valve element 21 is in its lower or "compression" position as shown in FIGURE 2, water under pressure entering valve block 1 through passage 34 is diverted by valve element 21 into an annular chamber 32 defined by valve block 1, valve element 21, shoulder 44, and the two valve faces 23 and 25. This water under pressure enters conduit 33 and motor chamber 13. Pressure chamber 10 and return chamber 12 on the inner sides of the two pistons are connected by passage 22 within valve element 21 and also vented to the exhaust port 31 above valve element 21. Water pressure in motor chamber 13 therefore moves the double piston assembly upwardly, compressing the air in compressor chamber 9 and forcing this air through check valve 7 into conduit 35 and tank 51 when the pressure exceeds that already existing in the air trapped in the tank 51. As the double piston assembly moves upwardly, an amount of water corresponding to the difference in displacement volume between chamber 12 and chamber 10 will be forced through exhaust port 31 to conduit 76, which may lead back to well 60 or to a suitable drain.

During this compression operation, valve element 21 is held seated on the lower valve seat 27 by the pressure of water in chamber 32 against shoulder 44 of valve element 21.

As the double piston assembly approaches the upward end of its stroke, spring 17 contacts lower end face 47 of valve element 21, and the spring is progressively compressed as upward motion of the piston assembly continues, until shoulder 49 contacts face 47 of valve element 21 and unseats it slightly from seat 27. This displacement breaks the holding action of water pressure on shoulder 44 by allowing water under pressure from chamber 32 to surround element 21 momentarily. This permits the elastic energy stored in spring 17 to shift valve element 21 quickly upward to its upper "intake" position shown in FIGURE 4.

Water under pressure from passage 34 is now diverted into return chamber 12 above motor piston 11, forcing piston 11 and the entire double piston assembly downward. Chamber 12 is connected to chamber 10 on the lower side of compression piston 8 by way of passage 22 through valve element 21, but the larger area of return face 15 of piston 11, as compared with pressure face 19 of piston 8, produces a resultant downward force, and the double piston assembly therefore moves downwardly. At the same time water in motor chamber 13 beneath piston 11 is conducted by way of the by-pass conduit 33 and chamber 32 around the outside of valve element 21 to exhaust port 31. During this operation valve element 21 is held in its upper position by water pressure acting against lower end face 47, which is of greater area than upper end face 48 of valve element 21. As the double piston assembly moves downwardly, the pressure in compressor chamber 9 drops, check valve 7 closes and when this pressure falls sufficiently the check valve 6 opens and inlet air enters and fills chamber 9.

As the double piston assembly approaches the bottom of its stroke, helical coil spring 20 contacts upper end face 48 of valve element 21 and is compressed by further downward movement of the pistons until shoulder 50 of stem 18 contacts upper end face 48, breaking the contact of valve face 25 on valve seat 30. Valve element 21 is thus again unseated, allowing water under pressure from conduit 34 to surround valve element 21 momentarily, and the elastic energy stored in spring 20 shifts valve element 21 quickly downward to its lower compression position as shown in FIGURE 2, thus reversing the operation of the device.

The compressor unit shown in FIGURE 2 continues to operate automatically in this manner, with alternate compression and intake strokes, until the air-water ratio in tank 51 is adjusted to lower the water level to the desired position therein.

Float 40 then operates to close float valve 41, cutting off the supply of water under pressure to the compressor device.

The present invention thus provides a fully automatic system for maintaining the desired volume of air in tank 51 and for introducing additional air under pressure whenever required to compensate for air dissolved in the water delivered to the system from tank 51. The compressor unit shown in FIGURE 2 is of sturdy construction and includes only four moving parts: the double piston assembly, the valve element 21, and the air valves 6 and 7. The float actuated inlet valve is similarly rugged and sturdy in construction and cooperates with the compressor unit to provide the advantages of automatic regulation of the air-to-water ratio within tank 51.

The rugged and durable construction of all elements of these systems provide the advantages of long and effective useful life, minimizing the need for repairs or adjustment and affording dependable trouble-free operation of water systems. Furthermore, the systems of the present invention are efficient and economical in construction and in operation, only a small volume of water being used and discharged to waste during operation of compressor unit 74.

The use of resilient O-rings to provide valve faces 23 and 25 and valve seat 43 minimizes the effects of wear, and further lengthens the useful life of the systems as a whole. The differential areas of the two pistons, and of the two ends of valve element 21, cooperating with the springs 17 and 20 and associated elements, provide automatic and dependable operation coupled with internal self-actuation of the compressor unit 74, eliminating the need for any external source of power to control or operate this regulating mechanism. The difference in effective areas of the two pistons also permits the unit 74 to produce pressures in chamber 9 greater than the motive pressure in conduit 34.

The principles of the present invention may be employed for automatic regulation of the ratio of any two fluids stored in a pressure tank, and its use is therefore not limited to the particular air-water systems described. The pumping or compressor unit 74 likewise lends itself to the solution of many fluid handling problems, since the motor piston may be powered by any fluid under pressure, and the pumping or compressor cylinder 2 may likewise be employed to deliver any fluid from inlet check valve 6 to delivery conduit 35, with the differential areas of the two pistons and the two ends of valve member 21 offering the advantages of self-actuation and dependability heretofore described.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. A fluid moving device adapted for continuous and self-actuated operation comprising, in combination,
   A. a compressor unit having a compression stroke and an intake stroke, and including
      a. a motor cylinder,
      b. a motor piston mounted in said motor cylinder,
      c. a pumping cylinder
         (1) having a smaller diameter than said motor cylinder and
         (2) having an inlet check valve and an outlet check valve,
      d. a pumping piston mounted in said pumping cylinder,
      e. said pistons being connected to reciprocate in synchronism,
   B. means forming a channel joining the adjacent portions of said cylinders,
   C. a first conduit entering said channel near said motor cylinder to admit a first fluid under pressure,
   D. an exhaust port in said channel near said pumping cylinder,
   E. a second conduit entering said channel between said first conduit and said exhaust port and joining said channel to the remote end of said motor cylinder,
   F. a hollow valve element
      a. loosely and movably positionable in said channel between an intake position and a compression position, b. said valve element having first and second resilient valve faces respectively positioned near each end of said element, and c. said valve element having a central constantly open water passage connecting the ends of said cylinders adjacent thereto, G. said channel having formed therein a. a first pair of valve seats flanking said first conduit entrance and said first resilient valve face, b. and a second pair of valve seats flanking said exhaust port and said second resilient valve face, c. said first resilient valve face being seated on one seat of said first pair of valve seats and said second valve face being seated on the corresponding seat of said second pair of valve seats in the intake position of said valve element, and d. said first resilient valve face being seated on the other seat of said first pair of valve seats and said second resilient valve face being seated on the other seat of said second pair of valve seats in the compression position of said valve element, H. and shifting means adjacent to each of said pistons and engaging said pistons to shift said valve element between said two positions in said channel, whereby said pumping piston is adapted to move a second fluid from said inlet check valve to said outlet check valve.

2. The fluid moving device defined in claim 1, wherein said resilient valve faces comprise two axially spaced substantially toroidal resilient circumferential valve faces, and said valve seats are axially spaced and comprise two pairs of facing substantially frusto-conical valve seats, each pair of said seats flanking one of said toroidal valve faces.

3. The fluid moving device defined in claim 1 in which said shifting means includes resilient means between each piston and said valve element positioned to move said valve element from each of its seated positions to the other, and shoulder means for unseating said valve element located between each piston and said valve element and engaging said valve element with the one of said pistons closest to said valve element at each end of said piston's stroke.

4. The combination defined in claim 1 in which said pistons are connected to reciprocate in synchronism by a unitary shaft extending through said channel, said valve element being loosely fitted within said channel substantially concentrically around said shaft, whereby said valve element centers itself in each resiliently seated position to perform a sealed valving action.

5. A fluid pressure actuated fluid moving device comprising, in combination,

A. a compressor unit having a compression stroke and an intake stroke, and including a. a motor cylinder, b. a motor piston mounted in said motor cylinder, c. a pumping cylinder (1) having a smaller diameter than said motor cylinder and (2) having an inlet check valve and an outlet check valve, d. a pumping piston mounted in said pumping cylinder, e. said pistons being connected to reciprocate in synchronism, B. means forming a stepped channel joining the adjacent portions of said cylinders, C. a first conduit entering a larger diameter portion of said channel near said motor cylinder to admit a first fluid under pressure, D. an exhaust port entering a smaller diameter portion of said channel near said pumping cylinder, E. a second conduit entering said channel between said first conduit and said exhaust port and joining said channel to the remote end of said motor cylinder, F. a hollow stepped valve element a. having a larger diameter flange portion and a smaller diameter body portion, b. said valve element being loosely and movably positionable in said stepped channel between an intake position and a compression position, c. said valve element having first and second re-resilient valve faces respectively positioned near each end of said element, and d. said valve element having a central constantly open water passage connecting the ends of said cylinders adjacent thereto, G. said channel having formed therein a. a first pair of valve seats flanking said first conduit entrance and said first resilient valve face, b. and a second pair of valve seats flanking said exhaust port and said second resilient valve face, c. said first resilient valve face being seated on one seat of said first pair of valve seats and said second valve face being seated on the corresponding seat of said second pair of valve seats in the intake position of said valve element, and d. said first resilient valve face being seated on the other seat of said first pair of valve seats and said second resilient valve face being seated on the other seat of said second pair of valve seats in the compression position of said valve element, H. said flange portion of said valve element being at the end of said valve element facing said motor cylinder, and having first and second opposed pressure controlled areas, a. said flange portion being juxtaposed with said first entering conduit to expose said first area to the fluid exiting through said exhaust port and said second area to the fluid being admitted through said first conduit during the compression stroke, and to expose said first area to the fluid being admitted through said first entering conduit and said second area to the fluid exiting through said exhaust port during the intake stroke to thereby positively seat said valve faces in their respective positions, I. and shifting means adjacent to each of said pistons and engaging said pistons to shift said valve element between said two positions in said channel.

6. The combination defined in claim 1 and said valve element being provided with a flange having first and second opposed pressure controlled areas at the end of the valve element facing said motor cylinder, said valve element flange being juxtaposed with said first entering conduit to expose said first area to the fluid exiting through said exhaust port and said second area to the fluid being admitted through said first conduit during the compression stroke, and to expose said first area to the fluid being admitted through said first entering conduit and said second area to the fluid exiting through said exhaust port during the intake stroke to thereby positively seat said valve faces in their respective positions.

References Cited in the file of this patent

UNITED STATES PATENTS

| | | |
|---|---|---|
| 547,519 | Kennan | Oct. 8, 1895 |
| 1,674,614 | Berkman | June 19, 1928 |

(Other references on following page)

UNITED STATES PATENTS

| | | |
|---|---|---|
| 2,231,307 | Wallace | Feb. 11, 1941 |
| 2,318,782 | Jorgensen | May 11, 1943 |
| 2,478,116 | Mariotte | Aug. 2, 1949 |
| 2,658,485 | Dreyer | Nov. 10, 1953 |
| 2,652,973 | Dibble et al. | Sept. 22, 1953 |
| 2,698,710 | Pedroia | Jan. 4, 1955 |
| 2,752,087 | Wallace | June 26, 1956 |
| 2,862,478 | Staats | Dec. 2, 1958 |
| 2,863,600 | Pedroia et al. | Dec. 9, 1958 |

FOREIGN PATENTS

| | | |
|---|---|---|
| 9,763 | Great Britain | Apr. 21, 1910 |
| 625,141 | France | Apr. 19, 1927 |